May 29, 1956  C. W. SIMPSON  2,747,881
MASTER COLLET JAW INSERTS
Filed July 20, 1953  2 Sheets-Sheet 1

INVENTOR.
CHARLES W. SIMPSON
BY Woodling and Krost,
attys.

May 29, 1956  C. W. SIMPSON  2,747,881
MASTER COLLET JAW INSERTS
Filed July 20, 1953  2 Sheets-Sheet 2

INVENTOR.
CHARLES W. SIMPSON

United States Patent Office 2,747,881
Patented May 29, 1956

2,747,881

MASTER COLLET JAW INSERTS

Charles W. Simpson, Cleveland, Ohio, assignor to The National Acme Company

Application July 20, 1953, Serial No. 369,042

16 Claims. (Cl. 279—46)

The invention relates in general to collets and more particularly to the method of fastening together replaceable pads in a master collet.

In many machine tools using a rotatable workpiece the workpiece is held in a collet which may be expanded and contracted to grip or release the workpiece. The machine tool will generally handle a large range of diameters of workpieces, and generally a master collet is used which will accommodate replaceable pads which in turn accommodate different diameters of workpieces. This obviates the necessity of changing the entire collet for a different diameter workpiece. The present invention relates to methods of fastening together the replaceable pads and the master collet body. Various other methods have been proposed in the past; however, the instant invention is directed to replaceable pads and master collet assembly which may be quickly and easily assembled and disassembled wherein the pads are positively locked into the collet body.

Some particular forms of collets are oftentimes called pushers, and these are generally used with pads which have smooth surfaces and are used to push bar stock forward into the tool engaging position as the main work engaging pusher is momentarily released. The present invention applies equally well to collets whether of the pusher type or of the type having toothed jaws for biting engagement with the work.

An object of the invention is to provide a positive interlocking between a replaceable pad and a collet body.

Another object of the invention is to provide tapered interlocking engagement between a replaceable pad or jaw member and a master collet body.

Another object of the invention is to provide large complementary and interengaging surfaces between the pad members and the complete body to provide a sturdy master collet.

Another object of the invention is to provide a master collet body and replaceable pad members which interengage on large surfaces to positively interlock and which do not require the use of any set screw or the like to receive any portion of the force exerted between the collet and the workpiece.

Still another object of the invention is to provide a master collet body and replaceable jaw members wherein a set screw is used merely as a safety feature, as a secondary means, to hold the replaceable jaw member in place.

Still another object of the invention is to provide an interengagement between a replaceable jaw member and a collet body which is tapered in two directions to interlock the jaw member and collet body both radially and arcuately.

Another object of the invention is to provide a master collet body and replaceable pad members wherein the driving engagement of the master collet with the workpiece increases the interlocking engagement between the master collet body and the pad members.

Other objects and a fuller understanding of this invention may be had by referring to the following description and claims, taken in conjunction with the accompanying drawings, in which:

Figure 3:
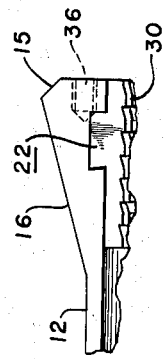
Figure 3 is a sectional view on the line 3—3 of Figure 1.

Figures 1 to 4 show the preferred embodiment of the invention incorporated in a master collet 11. This master collet 11 generally includes a collet body 12 and a plurality of replaceable pads or jaw members 13. The collet body 12 is made of some resilient material such as steel and is slotted at 14, in this case three slots, to provide resilient longitudinally extending fingers 15. The collet body 12 has a conical face 16 which may be engaged by a member, not shown, to radially contract the fingers 15 so that the master collet may engage a workpiece, not shown. The replaceable pads 13 and fingers 15 have been shown as being three in number; but it will be obvious that any number may be used, such as two, four, or six.

Figure 2:
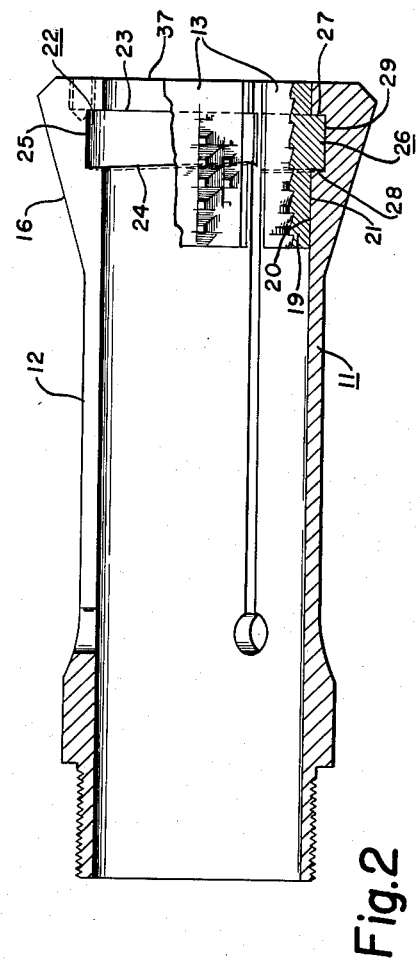
Figure 2 is a cross-sectional elevation view of a collet.

The pads 13 are generally arcuate in shape and have a skirt portion 19 with an outer surface 20 to engage the inner wall 21 of the collet body 12. The inner walls 21 define a hollow bore or annular recess within the collet 11 through which bar stock workpieces may be longitudinally passed. Each of the fingers 15 has a groove 22 which is defined by a forward edge 23, a rearward edge 24, and an outer wall 25. The pads 13 each have a radially extending rib 26 which is defined by a forward edge 27, a rearward edge 28, and an outer wall 29. As best seen in Figures 2 and 3, the rearward edges 24 and 28 are undercut slightly. These edges in combination with the forward edges in effect form a dovetail so that the pads 13 cannot be displaced radially inwardly once the forward and rearward edges are interlocked. The undercut on the rearward edges 24 and 28 is preferably of a nature to form a locking taper. In the present case they have been shown as being a two degree taper.

Figure 4:
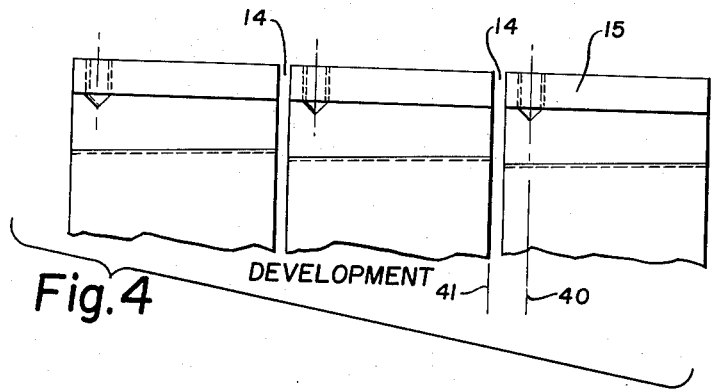
Figure 4 is a developed view of the forward end of the collet.

As best shown in Figures 2 and 4, the rearward edges 24 and 28 are provided with a locking taper in an arcuate direction to establish a wedging action. This locking taper has also been shown as being two degrees. The pads 13 may be moved arcuately relative to the fingers 15 to cammingly interlock the pads 13 and fingers 15 in a first relative arcuate direction. The collet 11 may be one which is designed primarily for unidirectional rotation, and as such the pads 13 may have teeth 30, which are essentially unidirectional, for gripping a workpiece. If such a unidirectional collet 11 is constructed, it is preferable to have the direction of movement of the finger 15 relative to the pad 13 to effect camming interlocking engagement, the same as the direction of movement of the collet 11 relative to the workpiece to effect this unidirectional driving engagement.

The large area of the interengaging surfaces 20 and 21, the edges 24 and 28, and the edges 23 and 27 will cause interlocking engagement between the pads 13 and fingers 15 such that the pads in effect become unitary with the fingers 15. There is no possibility for rattling or loose movement and there is no dependence upon a screw or the like to carry any part of the force transmitted from the collet body 12 to the workpiece. All force is absorbed through the surfaces 20, 21, 23, 24, 27, and 28. As an alternative design, it is possible to have interengagement between the outer walls 25 and 29 in conjunction with rather than the interengagement between surfaces 20 and 21. In any event, large surfaces carrying the radial force are presented.

Figure 1:
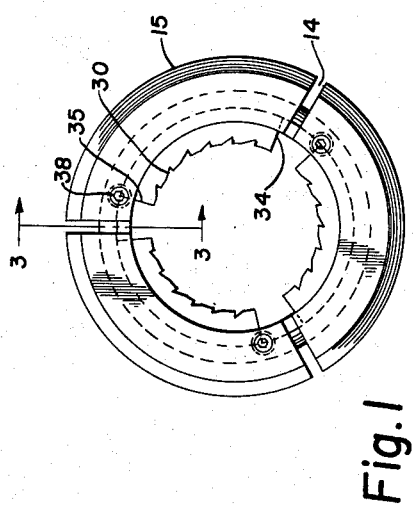
Figure 1 is a front view of a master collet constructed according to the invention.

The interlocking engagement between the pads 13 and fingers 15 is in the form of a bayonet lock. As best shown in Figure 1, the pads 13 are in locking engagement when a first edge 34 of the pad is disposed close to the slots 14. In this interlocked position the second edge 35 of the pads is arcuately displaced from the other slot which defines that particular finger. The fingers each have a generally longitudinally extending tapped opening 36 extending from the front face 37 of the collet body 12 into the recess or groove 22. Set screws 38 are screwed into the opening 36; and the nose 39 of the set screws, which may be pointed, is adapted to engage the edge 35. This will act as a safety feature to prevent arcute unlocking movement of the pads 13 relative to the fingers 15. The axis of the tapped opening 36 is shown as being parallel with the axis of the body 12; however, it may be slanted inwardly if desired so that the nose 39 of the set screw 38 will more readily engage the second edge 35. The set screw 38 has the prime function of engaging some part of the pads 13 to act as a safety feature in preventing untimely unlocking arcuate movements of the pads 13. The fact that the rearward edges 24 and 28 are disposed at a locking taper both radially and arcuately will cause interlocking engagement therebetween for all normal usages without even using the set screws 38.

The Figure 4 is a developed view of the front end of the collet body 12 to better show the peripheral dimension of the fingers 15 and the space occupied by the slots 14. In this example of a three fingered collet, each finger and adjoining space occupied one hundred twenty degrees. Each pad is about ninety to one hundred degrees in arcuate dimension. Since only a two degree locking taper is used, only a ten to twenty degree arcuate movement of the pads 13 relative to the fingers 15 is necessary to effect the interlocking engagement. If the pads are moved counterclockwise, as viewed in Figure 1, approximately ten to twenty degrees, they are in the unlocked position. It is then possible to remove one of the pad members 13 even though the other two pad members are still in place. The larger the included angle between forward and rearward edges in the wedging or arcuate direction, the smaller is the distance that the pad 13 must be moved to be completely unlocked. Conversely, the larger the included angle between forward and rearward edges in the radial or dovetail direction, the larger is the distance that the pad 13 must be moved to be completely unlocked. The Figure 4 shows a line 40 which is the second edge of the pad 13 in the locked position and shows another line 41 at the far edge of the adjacent slot. The distance between the two lines 40 and 41 is the maximum distance that the pad may be moved in an arcuate direction to change from locked to unlocked position. In some cases it may be advantageous to loosen all set screws 38 before removing the first pad 13 so that the two remaining pads may be moved slightly if necessary in the grooves 22 to aid in removal of the first pad. Similarly, upon installing the new different sized pads the first two inserted pads are maintained in a loosely fitting condition until the third pad has been inserted. At this time, all pads may be pushed over to the lock position and the set screws tightened down.

Figure 5:
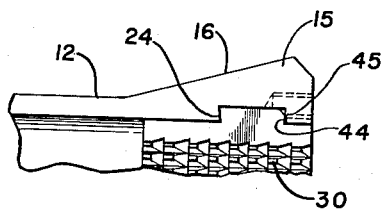
Figures 5 and 6 are views similar to Figures 3 and 4 of a modification.
Figure 6:
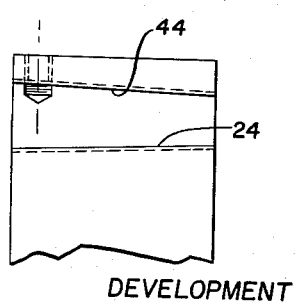

The Figures 5 and 6 show a modification wherein the forward edges 44 of the groove have a two degree taper in the radial direction which establishes a better dovetail. Similarly, the complementary forward edge 45 on the ribs 26 also has a two degree taper. The fact that both the forward and rearward edges have a two degree taper in the radial direction will not affect the distance which the pads must be moved arcuately between locked and unlocked positions. As best seen in Figure 6, the forward edges 44 on the collet body 12 have a two degree taper in the arcuate or wedging direction. The forward edge 45 on the rib 26 is complementary to the forward edge 44 and has the same taper in the arcuate direction. The fact that this two degree taper is provided, as well as the two degree taper in the arcuate direction on the rearward edge 24, means that approximately one-half the arcuate movement of the pad 13 relative to the body 12 is required between locked and unlocked positions. The included angle between the forward and rearward edges 44 and 24 in the arcuate direction is thus four degrees in this modification of Figures 5 and 6. This four degree included angle is still a locking taper; and hence, the pads 13 will cammingly engage the fingers 15 with the set screws 38 again being used as a safety measure.

The Figures 5 and 6 show that one of the forward and rearward edges may have a locking taper in the radial direction and the other of the forward and rearward edges may have a locking taper in the arcuate direction, and such construction is within the scope of the present invention. The Figures 1 to 4 show that one of the forward and rearward edges is normal to the axis of the collet body 12 while the other of the forward and rearward edges has a locking taper both in the radial and arcuate directions.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A collet for hollow spindles comprising a tubular member longitudinally slotted to form a plurality of resilient segments, replaceable jaw members for said resilient segments, a transverse undercut rib on one of said members and a transverse undercut groove in the other of said members, said undercut ribs and grooves being defined by surfaces extending arcuately, and at least one of said surfaces also extending axially to thus establish one of said ribs and grooves tapered in an arcuate direction for interlocking engagement upon relative arcuate movement between said collet and jaw members.

2. A collet for hollow spindles comprising a tubular member longitudinally slotted to form a plurality of resilient segments, replaceable jaw members for said resilient segments, a transverse undercut rib integral with each said jaw member and a transverse undercut groove in said segment for receiving said ribs, said undercut ribs and grooves being defined by surfaces extending arcuately, and at least one of said surfaces also extending axially to thus establish one of said ribs and grooves with a locking taper in an arcuate direction.

3. A collet for hollow spindles comprising a tubular member longitudinally slotted to form a plurality of resilient segments, replaceable jaw members for said resilient segments, a transverse undercut rib integral with each said jaw member and a transverse undercut groove in said segments for receiving said ribs, said undercut ribs and grooves being defined by surfaces extending arcuately, and at least one of said surfaces also extending axially to this establish one of said ribs and grooves tapered in an arcuate direction, and means in said collet for engaging said jaw member for preventing arcuate movement thereof.

4. A collet for hollow spindles comprising a tubular member longitudinally slotted to form a plurality of resilient segments, replaceable jaw members for said resilient segments with each jaw member having at least one generally radial edge, an integral undercut rib extending transversely on each said jaw member and an undercut groove extending transversely in said segments for receiving said ribs, said undercut ribs and grooves being defined by surfaces extending arcuately, and at least one of said surfaces also extending axially to thus establish one of said ribs and grooves tapered from a larger end to a smaller end in an arcuate direction, and a screw operable from the end of said collet near the larger end of said tapered groove for engaging only a generally radial edge of said jaw member for preventing arcuate movement thereof.

5. A spring collet, pads for said collet, first mutually abutting surfaces on said pads and collet for limiting longitudinal movement of said pads in one direction on said collet, second mutually abutting surfaces on said pads and collet for limiting opposite longitudinal movement of said pads and collet, third mutually abutting surfaces on said pads and collet for limiting outward radial movement of said pads in said collet, said first surfaces extending arcuately and slightly axially and providing a taper in a first arcuate direction to provide camming interlocking engagement between said pads and said collet upon relative arcuate movement between, one of said first and second surfaces also providing a tapered interlocking engagement to limit radially inward movement of said pads relative to said collet and in conjunction with said arcuate taper to cause camming engagement of said third surfaces, and means in said collet against an edge of said pads to prevent arcuate movement and unlocking of said first, second, and third surfaces.

6. A spring collet for use with a workpiece, pads for said collet, first mutually abutting surfaces on said pads and collet for limiting longitudinal movement of said pads in one direction on said collet, second mutually abutting surfaces on said pads and collet for limiting opposite longitudinal movement of said pads and collet, third mutually abutting surfaces on said pads and collet for limiting outward radial movement of said pads in said collet, said first and second surfaces extending in a first arcuate direction and tapering toward each other for a changing axial dimension therebetween to provide camming interlocking engagement between said pads and said collet upon relative arcuate movement therebetween, one of said first and second surfaces also providing a tapered interlocking engagement to limit radially inward movement of said pads relative to said collet and in conjunction with said arcuate taper to cause camming engagement of said third surfaces, the rotational direction of movement of the collet relative to the pads to effect said camming interlocking engagement being the same as the direction of movement of said collet relative to said workpiece to effect driving engagement therewith.

7. A spring collet, pads for said collet, first mutually abutting surfaces on said pads and collet for limiting longitudinal movement of said pads in one direction on said collet, second mutually abutting surfaces on said pads and collet for limiting opposite longitudinal movement of said pads and collet, third mutually abutting surfaces on said pads and collet for limiting outward radial movement of said pads in said collet, said first and second surfaces extending in a first arcuate direction and tapering toward each other for a changing axial dimension therebetween to provide camming interlocking engagement between said pads and said collet, said first and second surfaces also mutually providing a tapered interlocking engagement to limit radially inward movement of said pads relative to said collet and in conjunction with said arcuate taper to cause camming engagement of said third surfaces, first and second radial edges on each of said pads, each of said first radial edges lying substantially flush with an edge of a finger of said collet in the interlocking engagement position, and longitudinally movable screw means in said collet abuttable against the other radial edge of said pads to prevent arcuate movement and unlocking of said first, second, and third surfaces.

8. A collet having a plurality of segmental arcuate portions, each said segmental portion having a forward end face and an internal arcuate groove positioned at a distance from the forward end face and extended generally radially from the bore of said collet, replaceable pad members for said segmental portions disposed within the bore of said collet, said pad members having radially extending arcuate ribs adapted to fit into said grooves upon moving the pad members radially outwardly and arcuately in the collet, one of the rearward and forward edges of the ribs and grooves being undercut and one of the rearward and forward edges of the ribs and grooves being tapered to interlock in both a radial and one arcuate direction upon arcuate movement of the pad members in the collet, and means adapted to extend into said recess into engagement with a radial edge of said pad members to prevent arcuate movement thereof.

9. A collet having a plurality of segmental arcuate portions, each said segmental portion having a forward end face and an internal arcuate groove positioned at a distance from the forward end face and extended generally radially from the bore of said collet, replaceable pad members for said segmental portions disposed within the bore of said collet, said pad members having radially extending ribs adapted to fit into said grooves upon moving the pad members radially outwardly and arcuately in the collet, one of the rearward and forward edges of the ribs and grooves being undercut and one of the rearward and forward edges of the ribs and grooves being tapered to interlock in both a radial and one arcuate direction upon arcuate movement of the pad members in the collet, each of said segmental portions having a threaded opening extended from the forward end face of the collet to said grooves near one arcuate edge of the portion and disposed generally parallel to the bore of the collet, and a threaded member threadably engageable with each of said threaded openings and adapted to extend into said recess into engagement with a radial edge of said pad members to prevent arcuate movement thereof.

10. A collet having spring fingers extending generally longitudinally, complementary edges on each of said fingers defining a space between said fingers having a first given angle, arcuate pad members each having an arcuate outer surface conforming in curvature to the inner wall of said fingers, each of said pad members having generally radially extending ribs, grooves in each of said fingers adapted to receive said radially extending ribs, one of the rearward and forward edges of the ribs and grooves being undercut and one of the rearward and forward edges of the ribs and grooves being tapered to interlock in a radial direction upon arcuate movement of the pad members in the fingers, the arcuate dimension of the pad members being a second given angle, the arcuate dimension of one of said spring fingers being a third given angle, said tapering interlock being effected by movement of said pad members relative to said spring fingers through a fourth given angle to effect a bayonet locking interconnection between each of said pad members and the respective spring finger, the sum of said second and fourth given angles being less than the sum of said first and third given angles.

11. A collet having a bore, an annular recess in said bore, said bore being defined by a plurality of spring fingers extending generally longitudinally, complementary edges on each of said fingers defining a radial space between said fingers, arcuate pad members each having an arcuate outer surface conforming in curvature to the inner wall of said annular recess, each of said pad members having radially extending ribs, grooves in each of said fingers adapted to receive said radially extending ribs, one of the rearward and forward edges of the ribs and grooves being undercut and tapered to cammingly interlock in a radial direction upon arcuate movement of the pad members in the fingers, the arcuate dimension of the pad members being a first given angle, the arcuate dimension of one of said spring fingers being a second given angle, the arcuate dimension of said radial space being a third given angle, said tapering interlock being effected by movement of said pad members relative to said spring fingers through a fourth given angle to effect a bayonet locking interconnection between each of said pad members and the respective spring finger, the sum of said first and fourth given angles being less than the sum of said second and third given angles to permit arcuate unlocking movement of any one of said pad members relative to the respective spring finger even though all other pad members are in the interlocked position.

12. A collet having a bore, an annular recess in said bore, said bore being defined by three springs fingers extending generally longitudinally, complementary edges on each of said fingers defining a radial space between said fingers, three arcuate pad members each having an arcuate outer surface conforming in curvature to the inner wall of said annular recess, each of said pad members having radially extending ribs, grooves in each of said fingers adapted to receive said radially extending ribs, the rearward and forward edges of the ribs and grooves being undercut and tapered to interlock in a radial direction upon arcuate movement of the pad members in the fingers, the arcuate dimension of the pad members being a first given angle, the arcuate dimension of one of said spring fingers being a second given angle, the arcuate dimension of said radial space being a third given angle, said tapering interlock being effected by movement of said pad members relative to said spring fingers through a fourth given angle to effect a bayonet locking interconnection between each of said pad members and the respective spring finger, the sum of said first and fourth given angles being less than the sum of said second and third given angles to permit arcuate unlocking movement of any one of said pad members relative to the respective spring finger even though all other pad members are in the interlocked position.

13. A collet having a plurality of segmental arcuate portions, each said segmental portion having a forward end face and an internal arcuate groove positioned at a distance from the forward end face and extended generally from the bore of said collet, replaceable pad members for said segmental portions disposed within the bore of said collet, said pad members having radially extending ribs adapted to fit into said grooves upon moving the pad members radially outwardly and arcuately in the collet, the rearward and forward edges of the ribs and grooves being undercut and tapered to interlock in both a radial and one arcuate direction upon arcuate movement of the pad members in the collet, each of said segmental portions having a threaded opening extended from the forward end face of the collet to said grooves near one arcuate edge of the portion and disposed generally parallel to the bore of the collet, and a threaded member threadably engageable with each of said threaded openings and adapted to extend into said recess into engagement with a radial edge of said pad members to prevent arcuate movement thereof.

14. A collet comprising a body having a longitudinal axis and a spring finger extending longitudinally with an inner surface thereon, an arcuate recess in said inner surface, a pad engageable with said inner surface, an external rib on said pad extendable into said recess, a forward wall on said recess and said rib each substantially normal to the longitudinal axis of said body, a rearward wall on said recess and said rib each having approximately a two degree taper relative to a plane normal to said body axis and having approximately a two degree taper relative to perpendicular radials from said body axis, whereby relative arcuate movement of said finger and said pad provides camming and interlocking engagement therebetween, and screw means longitudinally movable in said spring finger and extendable into said recess in engagement with one edge of said pad to hold said pad against arcuate movement.

15. A collet comprising a body having a longitudinal axis and a spring finger extending longitudinally with an inner surface thereon, an arcuate recess in said inner surface, a pad engageable with said inner surface, an external rib on said pad extendable into said recess, a forward wall on said recess and said rib each substantially normal to the longitudinal axis of said body, a rearward wall on said recess and said rib each having approximately a two degree taper relative to a plane normal to said body axis and having approximately a two degree taper relative to perpendicular radials from said body axis, whereby relative arcuate movement of said finger and said pad provides camming and interlocking engagement therebetween with one edge of said pad generally flush with one edge of the spring finger, a tapped opening in the forward end of said spring finger generally longitudinally disposed and intersecting said recess, said pad having an arcuate length less than said spring finger, and a cone point screw threadably engaging said tapped opening and extending into said recess in engagement with the other edge of said pad to hold said pad against arcuate movement.

16. A collet comprising a body having a longitudinal axis and a plurality of spring steel fingers extending longitudinally with inner surfaces thereof defining a hollow cage, an arcuate recess in each of said inner surfaces, a pad engageable with each of said inner surfaces and enclosed by said cage, first and second generally radial edges on each pad, an external rib on each of said pads extendable into said recesses, a forward wall on each said recess and rib each substantially normal to the longitudinal axis of said body, a rearward wall on each said recess and rib each having approximately a two degree taper relative to a plane normal to said body axis and having approximately a two degree taper relative to perpendicular radials from said body axis, whereby relative arcuate movement of said body and each of said pads provides camming and interlocking engagement therebetween with the first edge of each of said pads being generally flush with the edge of the respective spring finger, a tapped opening in the forward end of each spring finger generally longitudinally disposed and intersecting said recess, said pads having an arcuate length less than said spring fingers, and cone point screws threadably engaging said tapped openings and extending into said recess in engagement with said second edge of said pads to hold said pads against arcuate movement.

References Cited in the file of this patent

UNITED STATES PATENTS

| | | |
|---|---|---|
| 73,028 | Nauen | Jan. 7, 1868 |
| 1,898,264 | Proefke | Feb. 21, 1933 |
| 2,534,616 | Milligan | Dec. 19, 1950 |
| 2,535,951 | Parigian | Dec. 26, 1950 |